A. C. ALLEN.
PRESSURE CONTROLLER.
APPLICATION FILED MAR. 29, 1912.

1,077,501.

Patented Nov. 4, 1913.
2 SHEETS—SHEET 1.

Witnesses
Chas. W. Stauffiger
Anna M. Dorr.

Inventor
Alfred C. Allen,
By
Attorneys

A. C. ALLEN.
PRESSURE CONTROLLER.
APPLICATION FILED MAR. 29, 1912.

1,077,501.

Patented Nov. 4, 1913.
2 SHEETS—SHEET 2.

Witnesses
Chas. W. Stauffiger
Anna M. Dorr

Inventor
Alfred C. Allen,
By
Attorneys

UNITED STATES PATENT OFFICE.

ALFRED C. ALLEN, OF DETROIT, MICHIGAN.

PRESSURE-CONTROLLER.

1,077,501.  Specification of Letters Patent.  Patented Nov. 4, 1913.

Application filed March 29, 1912. Serial No. 687,034.

*To all whom it may concern:*

Be it known that I, ALFRED C. ALLEN, a citizen of the United States of America, residing at Detroit, in the county of Wayne and State of Michigan, have invented certain new and useful Improvements in Pressure-Controllers, of which the following is a specification, reference being had therein to the accompanying drawings.

This invention relates to a pressure controller wherein an engine or like source of power that is operating a pump for forcing or exhausting fluid through a main or other like device is so regulated that the pressure at any desired place in the system to which the device is applied is maintained at a predetermined point.

The invention consists in the matters hereinafter set forth, and more particularly pointed out in the appended claims.

Figure 1:
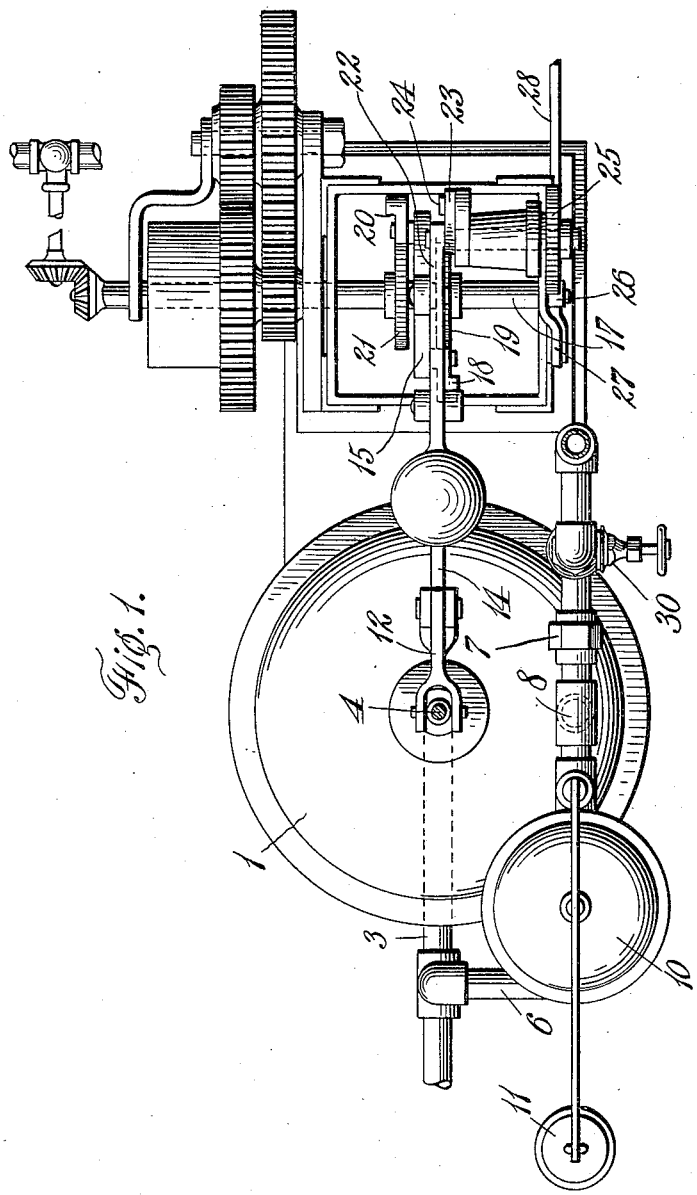
Figure 2:
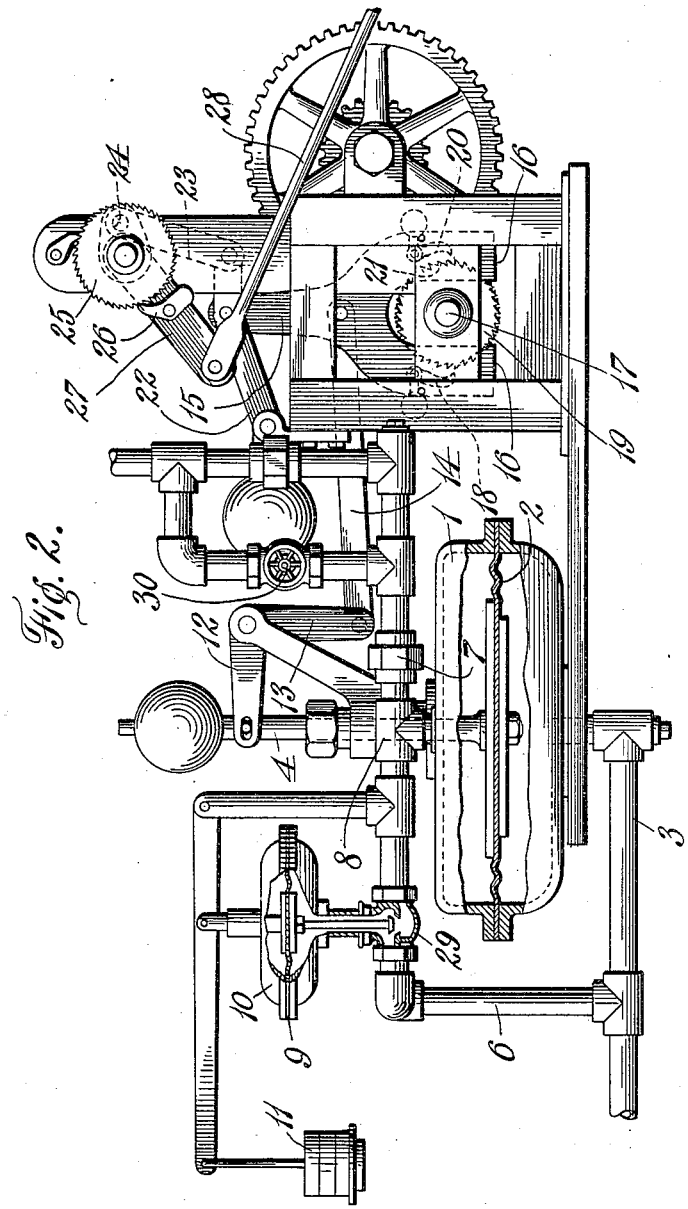

In the drawings, Figure 1 is a plan view of a device that embodies features of the invention; Fig. 2 is a view partially in side elevation and partially in section of the device.

Referring to the drawings, a pressure drum 1 with a flexible diaphragm 2 thereon or other like means adapted to be controlled by variations in fluid pressure is connected by a pipe 3 with any conduit or fluid container in a system in which it is desirable to utilize the pressure as a controlling agent. Full pressure of fluid in the pipe 3 is introduced in the drum on one side of the diaphragm 2 to shift the latter in one way and thereby move a stem 4 in one direction. Fluid from the pipe 3 or the like is also introduced against the other side of the diaphragm 2 or its equivalent by means of a countervailing valve 29 which controls a by-pass pipe 6 leading from the pipe 3 to the other compartment of the drum through a suitable fitting 8 and also discharging into the open air or to the low pressure side of the system through one or more restrictions or ajutages 7, such discharge being further controlled by a valve 30. The valve 29 is arranged to automatically open under pressure by the movement of a diaphragm 9 in an auxiliary pressure drum 10, the rise of the diaphragm being opposed by a lever and weight 11. By proper proportioning of the ajutages and the valve 30, this pressure may be regulated as desired. The diaphragm 2 thus operates in response to the differential pressure between the upper and lower chambers of the drum. A bell crank 12 is so connected to the stem 4 that the depending arm 13 of the crank swings or shifts a link 14 in one way or the other and thereby correspondingly moves a yoke 15 pivoted so that its arms 16 loosely embrace a controller shaft 17. When the yoke is swung in one direction a pawl 18 on one of the arms engages a ratchet wheel 19 to turn the shaft in one direction and when the yoke is at the other end of its swing, a second pawl 20 on the other arm engages another ratchet wheel 21 to turn the shaft 17 in the opposite direction. When in central position the ratchets are not engaged by either pawl. The yoke is reciprocated longitudinally by any suitable means, preferably through connection with a lever arm 22 whose free end portion is coupled by a connecting rod 23 with a stud or wrist pin 24 on a ratchet wheel 25. The latter is constantly rotated in one direction by means of a ratchet or dog 26 carried on a lever 27 that is coupled by a suitable member 28 to any part of the engine or motor to be controlled in such manner as to have a constant reciprocatory motion, the parts being so proportioned that the oscillations of the arm 27 due to this connection turn the wheel 25. The shaft 17 is coupled by any suitable means to the throttle valve in the engine to be controlled to open or close the latter in response to its own movements, or it may be made to control the current supply to a motor, or the water to a water wheel. As a result of this construction any increase in pressure in the pipe leading from the system to be controlled to the pressure regulator or drum increases the pressure on the top of the diaphragm and lowers the diaphragm stem or corresponding part of the latter and thereby shifts the yoke to turn the throttle operating or controller shaft in such direction that the throttle is choked down or other driving power partially cut off. Any fall in pressure allows the stem to rise under decrease in the upper pressure to shift the yoke to open the throttle. When the stem is in normal position, that is, under the differential pressure determined upon as normal, the yoke hangs clear of the shaft and the latter remains stationary. The weight on the main diaphragm stem is used to insure closing of the throttle or the like.

The advantage of the construction arises from the fact that the diaphragm has no work to perform other than to throw the yoke laterally in one direction or the other. This enables the apparatus to be set to respond to very slight variations in pressure, the work of turning the controller shaft being done entirely by the engine itself and the diaphragm being relieved of practically all friction other than that due to its own operation. By the use of the auxiliary valve the diaphragm does not have to stand the pipe pressure or the system pressure, so that it may be made very flexible and this also increases the responsiveness of the apparatus to slight variations from the normal pressure desired.

Obviously, changes in the details of construction may be made without departing from the spirit of the invention and I do not care to limit myself to any particular form or arrangement of parts.

What I claim is:—

1. A pressure controller comprising a rotatable member adapted to be operatively connected to a throttle, means for rotating the member adapted to be operated by a reciprocating member, an oscillatory member adapted when swung in one direction from neutral position to connect the driving mechanism with a rotatable throttle member to rotate the throttle in one direction and when moved in the other direction from neutral position to connect the driving mechanism with the rotatable throttle member to turn the latter in reverse direction, and fluid pressure controlled means operatively connected to the oscillatory member to move the latter in and out of such engagement in response to variations in pressure of fluid governing such means.

2. A pressure controller comprising a rotatable member for operating a throttle, a positively driven reciprocating member that is adapted to oscillate in either direction from a central, neutral point transversely to the reciprocatory movement, means adapted to be engaged by the reciprocating member when the latter is moved in one direction from its central, neutral position to rotate the throttle member in one direction and to turn the throttle in the other direction when the reciprocating member is moved in the other way from neutral position, a conduit, and means controlled by variations in drop in pressure of fluid in the conduit and adapted to oscillate the reciprocating member in response thereto in either direction from the central neutral position.

3. A pressure controller comprising a rotatable member for operating a regulating valve, a pendant member adapted when swung in one direction out of neutral position to rotate the valve operating member in one direction and when swung in the other direction from neutral position to rotate the valve operating member in reverse direction, a reciprocating member operatively connected to the reversing member to drive the latter, means for swinging the reversing member in either direction in and out of neutral position, and means operated by fluid under pressure and adapted to govern the movement of the means for swinging the reversing member.

4. The pressure controller comprising a pressure drum, a reciprocable member therein, a conduit in communication with the drum on one side of the movable member, means for admitting fluid under pressure from the conduit to the drum on the opposite side of the movable member at a pressure lower than that of the other drum compartment, mechanism for operating the throttle valve, and means governed by the movable member of the drum and adapted to regulate the direction of motion of the throttle operating means in response to the variations in pressure in the drum.

5. A pressure controller comprising a rotatable shaft, oppositely disposed ratchet wheels thereon, a reciprocable member oscillating transverse to its movement of reciprocation in either direction from a central, neutral position, adapted when moved from said central neutral position in one direction to engage one ratchet wheel to turn the shaft and when moved in the opposite direction to engage the other ratchet wheel to drive the shaft in reverse direction, mechanism for reciprocating the ratchet driving member, means for moving the ratchet driving member in either direction in and out of neutral position, and fluid pressure controlled means for operating the ratchet driving member controlling means.

6. A pressure controller comprising a rotatable shaft, oppositely disposed ratchet wheels thereon, a reciprocable member adapted when moved from neutral position in one direction to engage one ratchet wheel to turn the shaft and when moved in the opposite direction to engage the other ratchet wheel to drive the shaft in reverse direction, mechanism for reciprocating the ratchet driving member, means for controlling the position of the ratchet driving member, a pressure chamber, a movable member dividing the chamber into two compartments, a conduit opening into one compartment of the chamber, a by-pass leading to the conduit in communication with the other compartment of the chamber and having a restricted outlet and a countervailing valve controlling the by-pass and automatically holding the pressure in the communicating compartment of the drum at a predetermined ratio to the pressure in the other compartment.

In testimony whereof I affix my signature in presence of two witnesses.

ALFRED C. ALLEN.

Witnesses:
C. R. STICKNEY,
ANNA M. DORR.